No. 889,508. PATENTED JUNE 2, 1908.
I. COMPTON.
COMBINED VENTILATED RECEPTACLE AND STOOL.
APPLICATION FILED JULY 25, 1907.
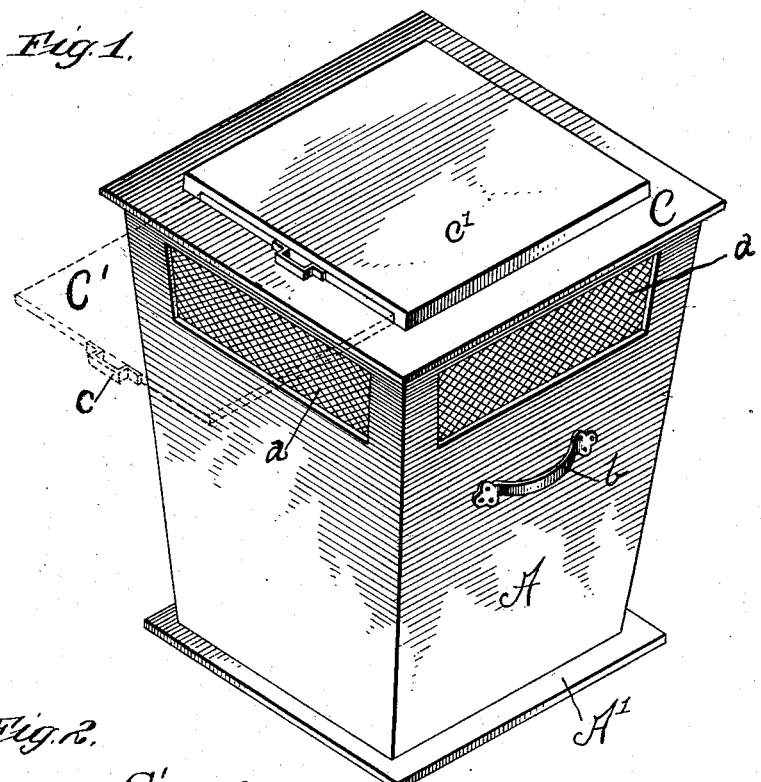
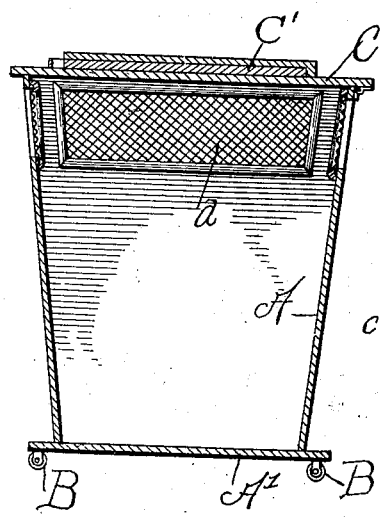
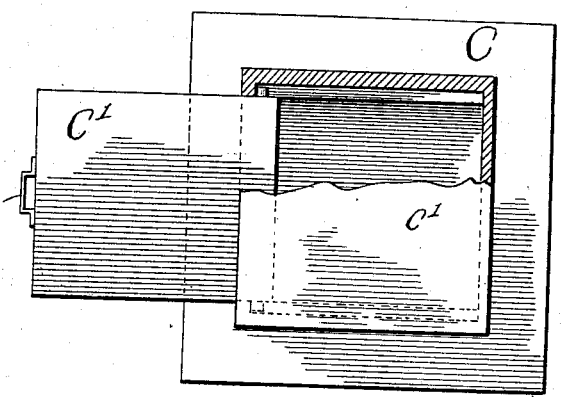

UNITED STATES PATENT OFFICE.

IDA COMPTON, OF CHICAGO, ILLINOIS.

COMBINED VENTILATED RECEPTACLE AND STOOL.

No. 889,508.      Specification of Letters Patent.      Patented June 2, 1908.

Application filed July 25, 1907. Serial No. 385,429.

*To all whom it may concern:*

Be it known that I, IDA COMPTON, a citizen of the United States, residing at Chicago, Cook county, Illinois, have invented certain new and useful Improvements in Combined Ventilated Receptacles and Stools, of which the following, taken in connection with the drawing, is a description.

My invention has for its object the production of a combined receptacle and stool, designed to be used in kitchens where space is small and there is no convenient place provided for vegetables, etc. This receptacle is arranged to form a bin for potatoes and the like, and has over it a cover which forms a seat, and beneath which is a sliding leaf which may be drawn out beside of the seat upon which anything may be laid for temporary convenience in cleaning vegetables, etc. Many kitchens, particularly in city flats are so small that there is no room for a chair, and this combination receptacle and stool is so constructed that it can be used as a seat when desired and when out of use can be kept under the kitchen table or sink and out of the way. These and other novel advantages of my construction will be hereinafter more fully pointed out in the description and claims.

I have illustrated what I now consider the preferred form of my construction in the accompanying drawings, although it is obvious that the details thereof may be modified without departing from the spirit of my invention, and in these drawings Figure 1 is a perspective view of my invention; Fig. 2 is a vertical cross section through the center of the same, and Fig. 3 is a top plan view, partly in section, to show the sliding leaf.

In carrying out my invention A represents a bin shaped receptacle supported on a base A' which projects beyond the sides thereof. In each side of the receptacle A preferably near the top thereof I provide means for ventilating the receptacle by cutting out a portion of the side of the receptacle and covering the opening with a screen $a$. These screen sections are arranged upon each side of the bin to permit circulation of air through the receptacle.

Casters B are secured to each corner of the base and the handles $b$ are secured to two or more of the sides of the receptacle, by means of which it can be easily moved from place to place.

A cover C is hinged to one side of the box A and is adapted to be opened upwardly when it is desired to fill or empty the receptacle. A sliding leaf C', provided with a handle $c$ on the end is arranged to slide under the top portion $c'$ of the cover. When the receptacle is used as a seat the leaf is used to set a pan or other article upon while cleaning vegetables, etc.

I claim:

In a device of the class described the combination of a bin shaped receptacle, screen sections fitted into the sides thereof, a hinged cover fitting over the top of said receptacle, and a sliding leaf adapted to be closed inside of said cover.

In testimony whereof I have signed this specification in the presence of two subscribing witnesses.

IDA COMPTON.

Witnesses:
     F. H. KING,
     G. W. JOHNSTON.